(12) United States Patent
Shikida et al.

(10) Patent No.: US 11,196,468 B2
(45) Date of Patent: Dec. 7, 2021

(54) CONTROL APPARATUS, RADIO COMMUNICATION METHOD, AND RADIO COMMUNICATION PROGRAM

(71) Applicant: NEC CORPORATION, Tokyo (JP)

(72) Inventors: Jun Shikida, Tokyo (JP); Naoto Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/078,595

(22) Filed: Oct. 23, 2020

(65) Prior Publication Data
US 2021/0126683 A1  Apr. 29, 2021

(30) Foreign Application Priority Data
Oct. 25, 2019 (JP) ............... JP2019-194141

(51) Int. Cl.
*H04B 7/0456* (2017.01)
*H04L 5/00* (2006.01)

(52) U.S. Cl.
CPC ......... *H04B 7/0478* (2013.01); *H04B 7/0482* (2013.01); *H04L 5/0007* (2013.01)

(58) Field of Classification Search
CPC .. H04B 7/0478; H04B 7/0482; H04B 7/0617; H04B 7/0456; H04L 5/0007; H04L 5/0035
See application file for complete search history.

(56) References Cited

U.S. PATENT DOCUMENTS

2015/0131753 A1* 5/2015 Maruta ............. H04L 25/03968
375/267

2017/0141826 A1* 5/2017 Kim ..................... H04B 7/0639
(Continued)

FOREIGN PATENT DOCUMENTS

JP  2017-225195 A  12/2017

OTHER PUBLICATIONS

Jun Shikida, Naoto Ishii and Yoshikazu Kakura, Performance Analysis of Low Complexity Multi-User MIMO Scheduling Schemes for Massive MIMO System, System Platform Research Laboratories, NEC Corporation, The 22nd Asia-Pacific Conference on Communications (APCC2016) (Year: 2016).*

(Continued)

*Primary Examiner* — Aristocratis Fotakis
(74) *Attorney, Agent, or Firm* — Sughrue Mion, PLLC

(57) ABSTRACT

A control apparatus includes a calculation unit configured to calculate, for each of radio apparatuses, a combination of a pre-coding weight and a post-coding weight using a first channel information matrix based on estimated values of channel responses between each of the radio apparatuses and each of terminals, a selection unit configured to select one combination from the combinations calculated using the first channel information matrices as a first combination, and an orthogonalization unit configured to generate a second channel information matrix for each of the radio apparatuses by projecting each first channel information matrix onto the subspace that is orthogonal to the post-coding weight included in the first combination. The calculation unit calculates a combination for each of the radio apparatuses using a second channel information matrix, and the selection unit selects one combination from the combinations calculated using the second channel information matrix as a second combination.

12 Claims, 9 Drawing Sheets

(56) References Cited

U.S. PATENT DOCUMENTS

2018/0139679 A1* 5/2018 Strom .................. H04W 40/12
2019/0363765 A1* 11/2019 Yoshioka ............ H04L 25/0202
2020/0212971 A1* 7/2020 Shikida ................ H04B 17/318

OTHER PUBLICATIONS

Tu Bui-Thi-Minh, Xung Le, Vien Nguyen-Duy-Nhat, A MMSE-based Beamforming Algorithm for MIMO Point-to-Point Full-Duplex Communication Systems, The University of Danang, VietNam, International Journal on Informatics Visualization, vol. 1 (2017) No. 3, (Year: 2017).*

"3rd Generation Partnership Project; Technical Specification Group Radio Access Network; Study on further enhancements to Coordinated Multi-Point(CoMP) Operation for LTE(Release 14)", 3GPP TR 36.741 V14.0.0, Mar. 2017, 25pages.

* cited by examiner

180
CONTROL APPARATUS, RADIO COMMUNICATION METHOD, AND RADIO COMMUNICATION PROGRAM

INCORPORATION BY REFERENCE

This application is based upon and claims the benefit of priority from Japanese patent application No. 2019-194141, filed on Oct. 25, 2019, the disclosure of which is incorporated herein in its entirety by reference.

TECHNICAL FIELD

The present disclosure relates to a control apparatus, a radio communication method, and a radio communication program.

BACKGROUND ART

In a radio communication system, a network configuration in which a plurality of radio apparatuses, which are transmission/reception points, are arranged in a distributed manner and baseband signal processing functions that correspond to the respective transmission/reception points are aggregated in a control apparatus has been under study. The control apparatus aggregates the baseband signal processing functions, whereby a cooperative control between the plurality of transmission/reception points becomes easy and an effect of arranging the transmission/reception points can be enhanced.

As a technique for cooperative transmission among the plurality of transmission/reception points, a Joint Transmission (JT) method in which signals are concurrently transmitted from the plurality of transmission/reception points to one radio terminal has been under discussion. As the JT method, two kinds of methods including a Coherent JT (CJT) method and a Non-coherent JT (NCJT) method have been under discussion.

The CJT method is a method in which precoding processing is performed in such a way that the signals transmitted from the plurality of transmission/reception points are in-phase with one another on the side of the radio terminal. In the CJT method, it is required to perform highly accurate time and frequency synchronization among the plurality of transmission/reception points in order to match the phases of the signals transmitted from the plurality of transmission/reception points. A technique related to the CJT method is disclosed in Japanese Unexamined Patent Application Publication No. 2017-225195. Japanese Unexamined Patent Application Publication No. 2017-225195 discloses a method of ensuring synchronization among the transmission/reception points for the CJT method. The method disclosed in Japanese Unexamined Patent Application Publication No. 2017-225195 ensures synchronization among the plurality of transmission/reception points using synchronization correction information transmitted from the radio terminal to the transmission/reception points.

Further, in the NCJT method, signals are transmitted to the radio terminal from the plurality of transmission/reception points without matching the phases of the signals among the plurality of transmission/reception points. Since the NCJT method is a method in which the phases of the signals transmitted from the plurality of transmission/reception points are not matched, there is no need to perform synchronization among the plurality of transmission/reception points. A technique related to the NCJT method is disclosed in 3GPP TR36.741 V14.0.0, March, 2017. This document discloses a method of transmitting data (CW: Codeword) from respective transmission/reception points in the NCJT method. Specifically, the above document discloses the transmission method in a case in which different pieces of data are transmitted from a plurality of transmission/reception points (Case 1) and a case in which the same data is transmitted from a plurality of transmission/reception points (Cases 2a and 2b).

In the case of the CJT method, there are restrictions in terms of implementation in order to ensure highly accurate time and frequency synchronization among a plurality of transmission/reception points. For example, in order to ensure synchronization of frequencies among the plurality of transmission/reception points, it is required that a plurality of transmission/reception points use same local oscillator. Further, even when the synchronization among the plurality of transmission/reception points is ensured, when the state of a radio propagation path (channel) between a radio terminal and transmission/reception points is changed due to a movement of the radio terminal or the like, it is possible that the phases of the signals of the plurality of transmission/reception points may not be matched. Thus, signals transmitted from the plurality of transmission/reception points may cancel each other and thus the reception quality in the radio terminal may be degraded.

Further, in the NCJT method as well, when the same data is transmitted from the plurality of transmission/reception points, since the phases of the signals of the plurality of transmission/reception points are not matched, it is possible that, in this method as well, the signals may cancel each other and thus the reception quality in the radio terminal may be degraded. Further, even in a case in which different pieces of data are transmitted from the plurality of transmission/reception points, it is possible that signals transmitted from the plurality of transmission/reception points may interfere with each other and thus the reception quality in the radio terminal may be degraded.

SUMMARY

The present disclosure has been made in order to solve the aforementioned problem and one of the objects of the present disclosure is to provide a control apparatus, a radio communication method, and a radio communication program capable of preventing the reception quality in the radio terminal from being degraded in the JT method.

A control apparatus according to the present disclosure includes:

a first calculation unit configured to calculate, for each of at least one radio terminal, a combination of a pre-coding weight and a post-coding weight for each of a plurality of radio apparatuses connected to the control apparatus using a first channel information matrix based on estimated values of channel responses between each of the plurality of radio apparatuses and each of the at least one radio terminal;

a selection unit configured to select, for each of the at least one radio terminal, one combination from the combinations calculated using the first channel information matrices as a first combination; and an orthogonalization unit configured to generate, for each of the at least one radio terminal, a second channel information matrix for each of the plurality of radio apparatuses by projecting each first channel information matrix onto the subspace orthogonal to the post-coding weight included in the first combination, in which the first calculation unit calculates, for each of the at least one radio terminal, the combination for each of the plurality of radio apparatuses using the second channel information matrix, and the selection unit selects, for each of the at least one radio terminal, one combination from the combinations calculated using the second channel information matrices as a second combination.

A radio communication method executed by a control apparatus according to the present disclosure includes:

calculating, for each of at least one radio terminal, a combination of a pre-coding weight and a post-coding weight for each of a plurality of radio apparatuses connected to the control apparatus using a first channel information matrix based on estimated values of channel responses between each of the plurality of radio apparatuses and each of the at least one radio terminal;

selecting, for each of the at least one radio terminal, one combination from the combinations calculated using the first channel information matrices as a first combination;

generating, for each of the at least one radio terminal, a second channel information matrix for each of the plurality of radio apparatuses by projecting each first channel information matrix onto the subspace orthogonal to the post-coding weight included in the first combination;

calculating, for each of the at least one radio terminal, the combination for each of the plurality of radio apparatuses using the second channel information matrix; and selecting, for each of the at least one radio terminal, one combination from the combinations calculated using the second channel information matrix as a second combination.

A radio communication program for causing a control apparatus according to the present disclosure causes the control apparatus to execute the following processing of:

calculating, for each of at least one radio terminal, a combination of a pre-coding weight and a post-coding weight for each of a plurality of radio apparatuses connected to the control apparatus using a first channel information matrix based on estimated values of channel responses between each of the plurality of radio apparatuses and each of the at least one radio terminal;

selecting, for each of the at least one radio terminal, one combination from the combinations calculated using the first channel information matrices as a first combination;

generating, for each of the at least one radio terminal, a second channel information matrix for each of the plurality of radio apparatuses by projecting each first channel information matrix onto the subspace orthogonal to the post-coding weight included in the first combination;

calculating, for each of the at least one radio terminal, the combination for each of the plurality of radio apparatuses using the second channel information matrix; and selecting, for each of the at least one radio terminal, one combination from the combinations calculated using the second channel information matrix as a second combination.

BRIEF DESCRIPTION OF DRAWINGS

The above and other aspects, features and advantages of the present disclosure will become more apparent from the following description of certain exemplary embodiments when taken in conjunction with the accompanying drawings, in which.

EMBODIMENTS

Hereinafter, example embodiments of the present disclosure will be described with reference to the drawings. The following descriptions and drawings are omitted and simplified as appropriate for clarity of explanation. Further, throughout the drawings, the same components are denoted by the same reference symbols and overlapping descriptions will be omitted as appropriate.

First Example Embodiment

Figure 1:
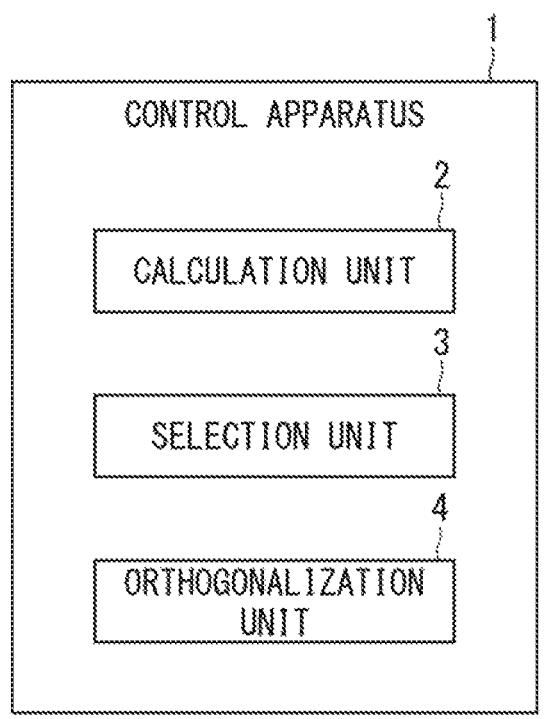
FIG. 1 is a diagram showing a configuration example of a control apparatus according to a first example embodiment.

With reference to FIG. 1, a control apparatus 1 according to a first example embodiment will be described. FIG. 1 is a diagram showing a configuration example of the control apparatus according to the first example embodiment. The control apparatus 1 is, for example, a control apparatus that controls a plurality of radio apparatuses (not shown) connected to the control apparatus 1 in a radio communication system. The control apparatus 1 and the plurality of radio apparatuses may form a radio base station in the radio communication system. The plurality of radio apparatuses perform radio communication with at least one radio terminal (not shown). The plurality of radio apparatuses may be referred to as transmission/reception points that transmit/receive signals. The control apparatus 1 includes a calculation unit 2, a selection unit 3, and an orthogonalization unit 4.

The calculation unit 2 calculates, for each of the radio terminals, a combination of a pre-coding weight and a post-coding weight for each of the radio apparatuses connected to the control apparatus, using a first channel information matrix based on estimated values of channel responses between each of the radio apparatuses and each of the radio terminals.

The selection unit 3 selects, for each of the radio terminals, one combination from the combinations calculated using the first channel information matrices as a first combination.

The orthogonalization unit 4 generates, for each of the radio terminals, a second channel information matrix for each of the plurality of radio apparatuses by projecting (converting) each first channel information matrix onto the subspace that is orthogonal to the post-coding weight included in the first combination.

The calculation unit 2 calculates, for each of the radio terminals, combinations of the pre-coding weights and the post-coding weights for each of the plurality of radio apparatuses using the second channel information matrix.

The selection unit 3 selects, for each of the radio terminals, one combination from the combinations of the pre-coding weights and the post-coding weights calculated using the second channel information matrices as a second combination.

As described above, the control apparatus 1 selects, for each of the radio terminals, one of the combinations of the pre-coding weights and the post-coding weights as the first combination using the first channel information matrix. The control apparatus 1 projects, for each of the radio terminals, the first channel information matrix onto the subspace orthogonal to the post-coding weight included in the selected combination, thereby generating the second channel information matrix. Then the control apparatus 1 selects, for each of the radio terminals, one of the combinations of the pre-coding weights and the post-coding weights calculated using the second channel information matrix as the second combination.

The second channel information matrix is a channel information matrix in which the first channel information matrix is projected onto the subspace orthogonal to the post-coding weight included in the first combination. Thus, the signals transmitted based on the pre-coding weight included in the first combination and the pre-coding weight included in the second combination become orthogonal to each other. In this way, the control apparatus 1 is able to select the pre-coding weight in which signals that are orthogonal to each other are transmitted from the plurality of radio apparatuses to each of the radio terminals. That is, the control apparatus 1 is able to transmit signals that are orthogonal to each other in the radio terminal from the plurality of radio apparatuses to each of the radio terminals. Therefore, the respective signals transmitted from the plurality of radio apparatuses do not interfere with other signals transmitted from the plurality of radio apparatuses. Thus, according to the control apparatus 1 according to the first example embodiment, it is possible to prevent the reception quality in the radio terminal from being degraded.

Second Example Embodiment

Next, a second example embodiment will be described. The second example embodiment is an example embodiment in which the first example embodiment is made more specific.

<Configuration Example of Radio Communication System>

Figure 2:
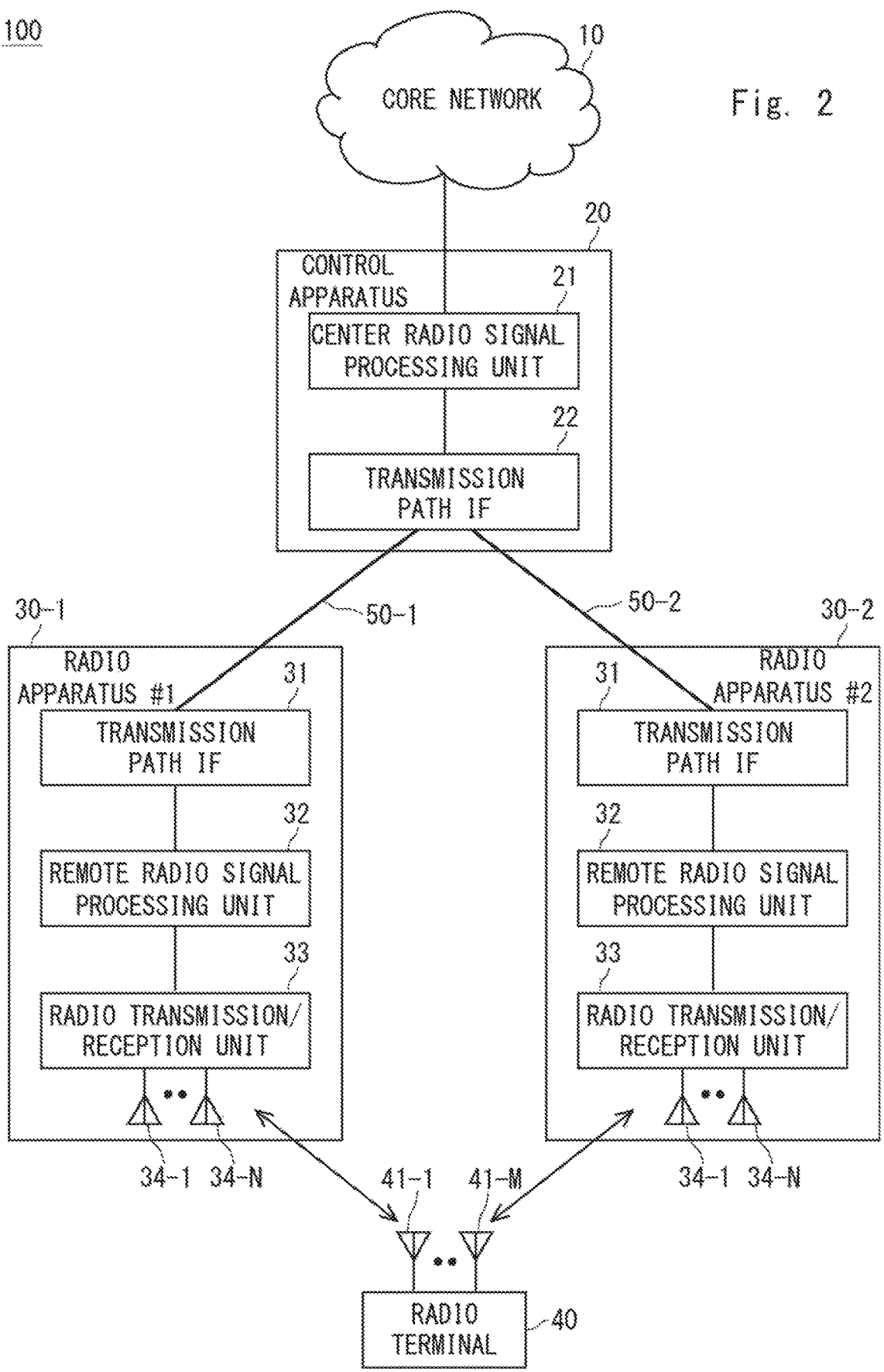
FIG. 2 is a diagram showing a configuration example of a radio communication system according to a second example embodiment.

Referring to FIG. 2, a configuration example of a radio communication system 100 according to the second example embodiment will be described. FIG. 2 is a diagram showing a configuration example of a radio communication system according to the second example embodiment. As shown in FIG. 2, the radio communication system 100 includes a core network 10, a control apparatus 20, radio apparatuses 30-1 and 30-2, and a radio terminal 40. While the radio communication system 100 is configured to include two radio apparatuses 30-1 and 30-2, it may be configured to include three or more radio apparatuses.

The core network 10 is, for example, a network formed of a core network apparatus defined by the Third Generation Partnership Project (3GPP). The core network 10 is connected to the control apparatus 20, and when data is transmitted from a control apparatus other than the control apparatus 20 to the radio terminal 40, the control apparatus 20 receives this data from the core network 10. When data is transmitted from a control apparatus other than the control apparatus 20 to the radio terminal 40, the control apparatus 20 may receive this data using an interface with the other control apparatus.

The control apparatus 20 corresponds to the control apparatus 1 according to the first example embodiment. The control apparatus 20 may be, for example, a Central Unit or a Centralized Unit (CU), or may be an aggregation node in a Centralized Radio Access Network (C-RAN) configuration. The control apparatus 20 is connected to and communicates with the radio apparatus 30-1 via a transmission path 50-1. Further, the control apparatus 20 is connected to and communicates with the radio apparatus 30-2 via a transmission path 50-2. The transmission paths 50-1 and 50-2 are, for example, media such as optical fibers, metal cables, or radio propagation paths that are used to transmit information.

Each of the radio apparatuses 30-1 and 30-2 may be, for example, a Radio Unit or a Remote Unit (RU), a Distributed Unit (DU), a Transmission Reception Point (TRP), or may be a distributed node in the C-RAN configuration. At least one of the radio apparatuses 30-1 and 30-2 may be provided in a place physically apart from the control apparatus 20. The radio apparatuses 30-1 and 30-2 are connected to and performs radio communication with the radio terminal 40 via a radio propagation path.

In the following description, the radio apparatus 30-1 may be referred to as a radio apparatus #1 and the radio apparatus 30-2 may be referred to as a radio apparatus #2. Further, when there is no need to differentiate the radio apparatuses 30-1 and 30-2, they may be simply referred to as a "radio apparatus 30". Further, when there is no need to differentiate the transmission paths 50-1 and 50-2, they may be simply referred to as a "transmission path 50".

The radio terminal 40 may be, for example, a mobile station, a User Equipment (UE), or a relay apparatus that includes a relay function. The radio terminal 40 includes antennas 41-1 to 41-M (M is an integer equal to or larger than two), a radio transmission/reception unit (not shown), and a radio signal processing unit (not shown). In the following description, when there is no need to differentiate the antennas 41-1 to 41-M, they may be simply referred to as an "antenna 41".

<Configuration Example of Control Apparatus>

Next, a configuration example of the control apparatus 20 will be described. As shown in FIG. 2, the control apparatus 20 includes a center radio signal processing unit 21 and a transmission path Interface (IF) 22.

The center radio signal processing unit 21 includes some of the functions of a Physical (PHY) layer and functions of layers higher than the PHY layer. Note that some of the functions of the center radio signal processing unit 21 may have a configuration controlled by another apparatus physically located away from it. The detailed configuration of the center radio signal processing unit 21 will be described later.

The transmission path IF 22 communicates with a transmission path IF 31 of the radio apparatus 30 via the transmission path 50.

<Configuration Example of Radio Apparatus>

Next, a configuration example of the radio apparatus 30 will be described. As shown in FIG. 2, the radio apparatus 30 includes a transmission path Interface (IF) 31, a remote radio signal processing unit 32, a radio transmission/reception unit 33, and antennas 34-1 to 34-N (N is an integer equal to or larger than two).

The transmission path IF 31 communicates with the transmission path IF 22 of the control apparatus 20 via the transmission path 50.

The remote radio signal processing unit 32 includes some of the functions of the PHY layer. The remote radio signal processing unit 32 includes, for example, a Fast Fourier Transform (FFT) projecting function, an Inverse Fast Fourier Transform (IFFT) projecting function, a multiplication function of the pre-coding weight and the like.

The radio transmission/reception unit 33 projects a baseband signal into a radio frequency signal and projects a radio frequency signal into a baseband signal.

The antennas 34-1 to 34-N each transmit a radio frequency signal to the radio terminal 40 and each receive a radio frequency signal transmitted from the radio terminal 40. In the following description, when there is no need to differentiate the antennas 34-1 to 34-N, they may be simply referred to as an "antenna 34".

<Configuration Example of Center Radio Signal Processing Unit>

Figure 3:
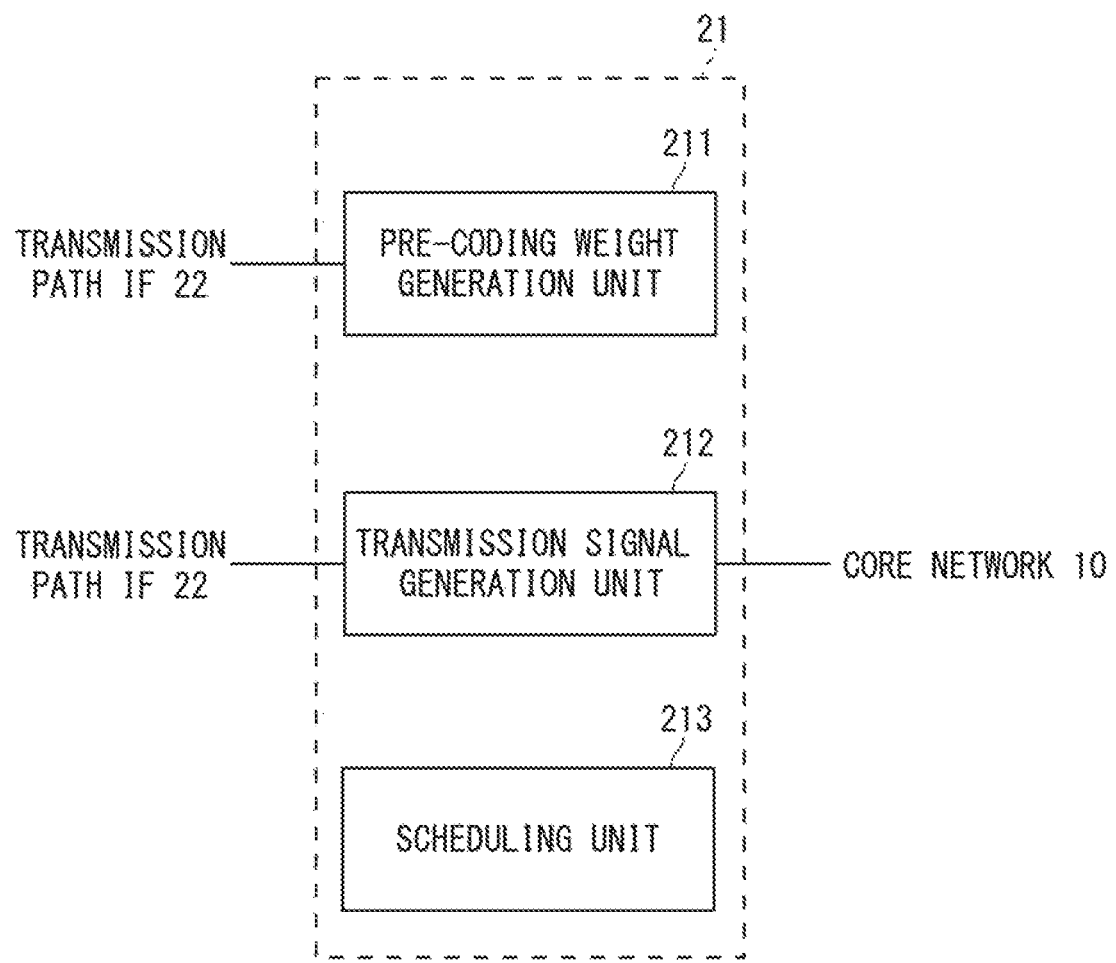
FIG. 3 is a diagram showing a configuration example of a center radio signal processing unit according to the second example embodiment.

Referring next to FIG. 3, the detailed configuration of the center radio signal processing unit 21 will be described. FIG. 3 is a diagram showing a configuration example of the center radio signal processing unit according to the second example embodiment. As shown in FIG. 3, the center radio signal processing unit 21 includes a pre-coding weight generation unit 211, a transmission signal generation unit 212, and a scheduling unit 213. In FIG. 3, functional blocks that have no direct relations with the present disclosure are not shown.

The pre-coding weight generation unit 211 receives a reception signal from the radio apparatus 30 via the transmission path IF 22. Further, the pre-coding weight generation unit 211 receives the estimation value of the channel response between each of the antennas 34 of the radio apparatus 30 and each of the antennas 41 of the radio terminal 40. The pre-coding weight generation unit 211 generates a pre-coding weight using the reception signal or the estimation value of the channel response that has been received and transmits the generated pre-coding weight to the radio apparatus 30 via the transmission path IF 22.

While the radio apparatus 30 includes a multiplication function of the pre-coding weight received from the pre-coding weight generation unit 211 in this example embodiment, the transmission signal generation unit 212 may have a multiplication function of the pre-coding weight. In this case, the pre-coding weight generation unit 211 transmits the generated pre-coding weight to the transmission signal generation unit 212. The detailed configuration of the pre-coding weight generation unit 211 will be described later.

The transmission signal generation unit 212 generates the signal to be transmitted to the radio terminal 40 and transmits the generated signal to the radio apparatus 30 via the transmission path IF 22. As described above, the transmission signal generation unit 212 may have a multiplication function of the pre-coding weight.

The scheduling unit 213 performs scheduling regarding the communication between the radio apparatus 30 and the radio terminal 40. The scheduling unit 213 may receive the pre-coding weight and the estimation value of the channel response from the pre-coding weight generation unit 211 and perform scheduling using the pre-coding weight and the estimation value of the channel response that have been received. Further, the scheduling unit 213 determines a data transmission method in a JT method. Specifically, the data transmission method in the JT method includes a transmission method in which the radio apparatuses 30-1 and 30-2 send the same data to the radio terminal 40 and a transmission method in which they send different data to the radio terminal 40. The scheduling unit 213 determines which one of the two transmission methods should be used.

<Configuration Example of Pre-Coding Weight Generation Unit>

Figure 4:
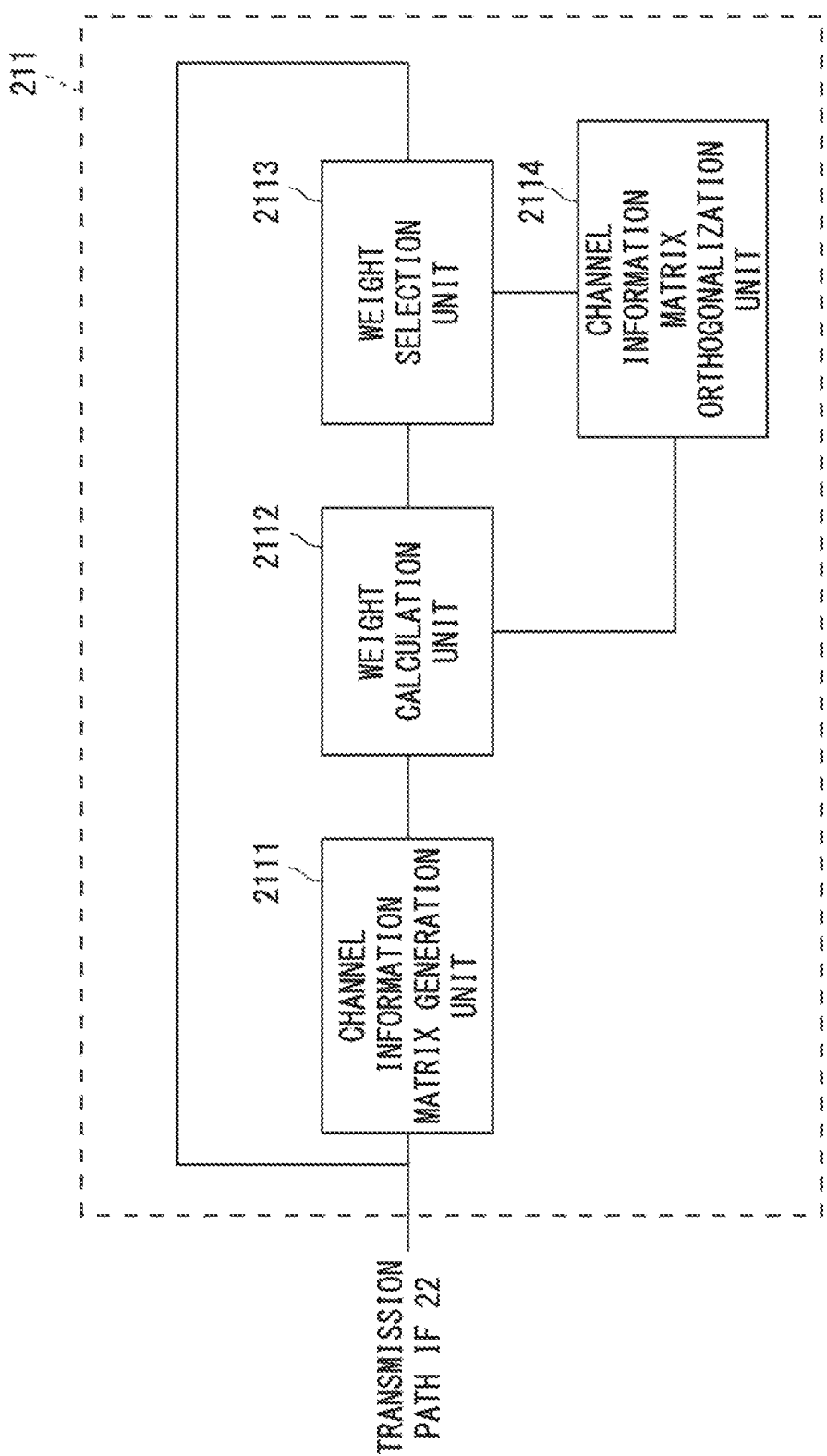
FIG. 4 is a diagram showing a configuration example of a pre-coding weight generation unit according to the second example embodiment.

Referring next to FIG. 4, the detailed configuration of the pre-coding weight generation unit 211 will be described. FIG. 4 is a diagram showing a configuration example of the pre-coding weight generation unit according to the second example embodiment. As shown in FIG. 4, the pre-coding weight generation unit 211 includes a channel information matrix generation unit 2111, a weight calculation unit 2112, a weight selection unit 2113, and a channel information matrix orthogonalization unit 2114.

The channel information matrix generation unit 2111 acquires the estimation value of the channel response between each of the antennas 34-1 to 34-N of the radio apparatus 30 and each of the antennas 41-1 to 41-M of the radio terminal 40 and generates a channel information matrix.

The channel information matrix generation unit 2111 may acquire the estimation value of the channel response by estimating the channel response. Alternatively, the remote radio signal processing unit 32 of the radio apparatus 30 may estimate a channel response and the channel information matrix generation unit 2111 may acquire the estimation value of the channel response from the remote radio signal processing unit 32 via the transmission path 50. Alternatively, the remote radio signal processing unit 32 may generate a channel information matrix based on the estimation value of the channel response and the channel information matrix generation unit 2111 may acquire the channel information matrix from the remote radio signal processing unit 32 via the transmission path 50.

The channel information matrix may be a channel matrix including the estimation value of the channel response between each of the antennas 34-1 to 34-N of the radio apparatus 30 and each of the antennas 41-1 to 41-M of the radio terminal 40 as each element. Alternatively, the channel information matrix may be a correlation matrix of a channel matrix including the estimation value of the channel response between each of the antennas 34-1 to 34-N of the radio apparatus 30 and each of the antennas 41-1 to 41-M of the radio terminal 40 as each element.

The channel information matrix generation unit 2111 transmits the generated channel information matrix or the channel information matrix acquired from the remote radio signal processing unit 32 to the weight calculation unit 2112.

The weight calculation unit 2112 corresponds to the calculation unit 2 according to the first example embodiment. The weight calculation unit 2112 calculates, for each of the radio apparatuses 30-1 and 30-2, combinations of the pre-coding weights and the post-coding weights one by one using the channel information matrix transmitted from the channel information matrix generation unit 2111.

When the number of combinations held in the weight selection unit 2113 is smaller than a predetermined number, the weight calculation unit 2112 calculates the above combinations one by one for the radio apparatuses 30-1 and 30-2 using the channel information matrix transmitted from the channel information matrix orthogonalization unit 2114. Note that the predetermined number may be equal to, for example, the number of antennas 41 of the radio terminal 40.

The weight calculation unit 2112 transmits the combinations of the pre-coding weights and post-coding weights that have been calculated to the weight selection unit 2113.

The weight selection unit 2113 corresponds to the selection unit 3 according to the first example embodiment. When the number of combinations to be held in the weight selection unit 2113 is smaller than a predetermined number, the weight selection unit 2113 selects one of the combinations calculated for each of the radio apparatuses 30-1 and 30-2 and holds the selected combination.

The weight selection unit 2113 transmits the selected pre-coding weight to the radio apparatus 30 that corresponds to the selected pre-coding weight via the transmission path IF 22. The weight selection unit 2113 transmits the pre-coding weight and post-coding weight that have been selected to the channel information matrix orthogonalization unit 2114.

The channel information matrix orthogonalization unit 2114 corresponds to the orthogonalization unit 4 according to the first example embodiment. When the number of combinations that are held is smaller than the predetermined number, the channel information matrix orthogonalization unit 2114 projects the channel information matrix of each of the radio apparatuses 30-1 and 30-2 onto the subspace orthogonal to the post-coding weight transmitted from the weight selection unit 2113. The channel information matrix orthogonalization unit 2114 transmits the channel information matrix that has been subjected to the orthogonal transformation to the weight calculation unit 2112.

When the channel information matrix transmitted from the weight selection unit 2113 is a channel information matrix generated by the channel information matrix generation unit 2111, the channel information matrix orthogonalization unit 2114 performs the above conversion on this channel information matrix.

When the transmitted channel information matrix is a channel information matrix in which the channel information matrix generated by the channel information matrix generation unit 2111 has been projected once or more times, the channel information matrix orthogonalization unit 2114 further performs the above conversion on this channel information matrix.

When the channel information matrix is a channel matrix including the aforementioned estimated value of the channel response as each element, the channel information matrix orthogonalization unit 2114 performs the above conversion on this channel matrix.

When the channel information matrix is a channel matrix in which the aforementioned channel matrix has been projected once or more times, the channel information matrix orthogonalization unit 2114 further performs the above conversion on this channel matrix.

Further, when the channel information matrix is a correlation matrix of the channel matrix including the aforementioned estimation value of the channel response as each element, the channel information matrix orthogonalization unit 2114 performs the above conversion on this correlation matrix.

When the channel information matrix is a correlation matrix in which the above correlation matrix has been projected once or more times, the channel information matrix orthogonalization unit 2114 further performs the above conversion on this correlation matrix.

<Operation Example of Pre-Coding Weight Generation Unit>

Figure 5:
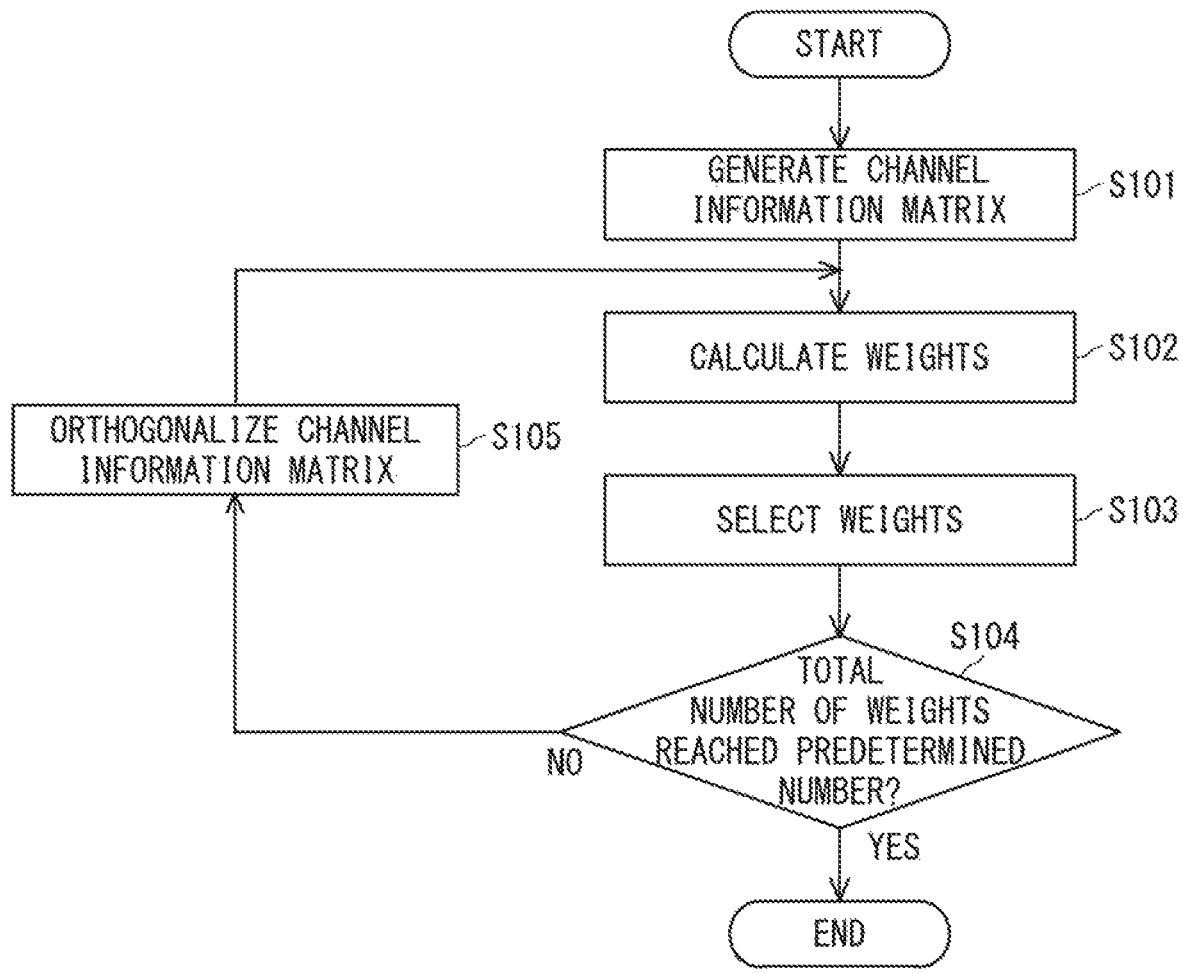
FIG. 5 is a flowchart showing an operation example of a pre-coding weight generation unit according to the second example embodiment.

Referring next to FIG. 5, an operation example of the pre-coding weight generation unit 211 will be described.

FIG. 5 is a flowchart showing an operation example of the pre-coding weight generation unit according to the second example embodiment.

First, the channel information matrix generation unit 2111 acquires the estimation value of the channel response between each of the antennas 34-1 to 34-N of the radio apparatus 30 and each of the antennas 41-1 to 41-M of the radio terminal 40 and generates the channel information matrix (Step S101).

The channel information matrix may be a channel matrix including the estimation value of the channel response between each of the antennas 34-1 to 34-N of the radio apparatus 30 and each of the antennas of the radio terminal 40 as each element. Alternatively, the channel information matrix may be a correlation matrix of the channel matrix including the estimation value of the channel response between each of the antennas 34-1 to 34-N of the radio apparatus 30 and each of the antennas of the radio terminal 40 as each element.

Next, the weight calculation unit 2112 calculates, for each of the radio apparatuses 30-1 and 30-2, combinations of the pre-coding weights and the post-coding weights one by one using the generated channel information matrix (Step S102).

Now, the method in which the weight calculation unit 2112 calculates the combinations of the pre-coding weights and the post-coding weights will be described. In the following description, an M×N-dimensional channel matrix between the radio terminal 40 and a radio apparatus 30-$b$ (b is 1 or 2) is denoted by $H_b$. Then an N-dimensional pre-coding weight vector for the radio apparatus 30-$b$ is denoted by $v_b$ and an M-dimensional post-coding weight vector for the radio apparatus 30-$b$ is denoted by $u_b$.

One example of the method of calculating the combinations of the pre-coding weights and the post-coding weights is a method of using the singular value decomposition on the channel matrix. When the channel information matrix is the aforementioned channel matrix, the weight calculation unit 2112 calculates the combinations of the pre-coding weights and the post-coding weights based on the singular value decomposition on the channel matrix.

Specifically, the weight calculation unit 2112 performs the singular value decomposition on the M×N-dimensional channel matrix $H_b$ and sets an N-dimensional right singular vector that corresponds to the maximum singular value to be the N-dimensional pre-coding weight vector $v_b$. Further, the weight calculation unit 2112 sets an M-dimensional left singular vector that corresponds to the maximum singular value to be the M-dimensional post-coding weight vector $u_b$.

Another example of the method of calculating the combinations of the pre-coding weights and the post-coding weights is a method of using the eigenvalue decomposition on the correlation matrix of the channel matrix. When the channel information matrix is a correlation matrix of the above channel matrix, the weight calculation unit 2112 calculates the combinations of the pre-coding weights and the post-coding weights based on the eigenvalue decomposition on the correlation matrix and the channel matrix that corresponds to the correlation matrix. The channel matrix that corresponds to the correlation matrix is a channel matrix used when the correlation matrix is calculated.

Specifically, the weight calculation unit 2112 calculates the post-coding weight for each of the radio apparatuses 30-1 and 30-2 based on the eigenvalue decomposition for the correlation matrix. The weight calculation unit 2112 calculates, for each of the radio apparatuses 30-1 and 30-2, a pre-coding weight that forms a combination with the post-coding weight based on the channel matrix and the post-coding weights of the radio apparatuses 30-1 and 30-2.

More specifically, the weight calculation unit 2112 performs the eigenvalue decomposition on the M×M-dimensional correlation matrix, which is the product of M×N-dimensional channel matrix $H_b$ and the Hermitian transpose of $H_b$ and sets an M-dimensional eigenvector that corresponds to the maximum eigenvalue as the M-dimensional post-coding weight vector $u_b$. Then the weight calculation unit 2112 calculates the N-dimensional precoding vector $v_b$ that corresponds to the M-dimensional post-coding weight vector $u_b$ from the product of the Hermitian transpose of the M×N-dimensional channel matrix $H_b$ and $u_b$. Since it is possible that the magnitude of the calculated $v_b$ may not be 1, it may be normalized as necessary. While the method of using the eigenvalue decomposition on the M×M-dimensional correlation matrix has been described in this example, the weight calculation unit 2112 may use the eigenvalue decomposition on the N×N-dimensional correlation matrix, which is the product of the Hermitian transpose of $H_b$ and $H_b$.

As another example of the method of calculating the combinations of the pre-coding weights and the post-coding weights, weights that have been prepared in advance may be used for the pre-coding weights. Specifically, a weight in which the channel gain becomes a maximum may be employed as the pre-coding weight from among the weights that have been prepared in advance and the post-coding weight may be calculated using the pre-coding weight that has been employed and the channel matrix.

The descriptions will be continued referring once again to FIG. 5. In Step S103, the weight selection unit 2113 calculates, for each of the radio apparatuses 30-1 and 30-2, one of the combinations of the pre-coding weights and the post-coding weights that have been calculated (Step S103).

One example of the method of selecting the pre-coding weight and the post-coding weight is a method of selecting a combination of the pre-coding weight and the post-coding weight in which the channel gain becomes a maximum. Thus, the weight selection unit 2113 may select a combination in which the channel gain becomes a maximum from the combinations calculated by the weight calculation unit 2112.

As the channel gain, when the pre-coding weight and the post-coding weight are calculated in the weight calculation unit 2112, the singular value or the eigenvalue calculated by the weight calculation unit 2112 may be used. Alternatively, the channel gain may be calculated by the product of the channel matrix, the pre-coding weight, and the post-coding weight. Alternatively, the channel gain may be calculated from the product of the correlation matrix of the channel matrix and the pre-coding weight or the post-coding weight.

Further, another example of the method of selecting the pre-coding weight and the post-coding weight may be a method of selecting a combination of the pre-coding weight and the post-coding weight in which the reception power becomes a maximum. Thus, the weight selection unit 2113 may select the combination in which the reception power becomes a maximum from the combinations calculated by the weight calculation unit 2112.

The reception power is calculated from the product of the channel gain and the transmission power of the radio apparatus 30. The channel gain may be calculated in a way similar to that in the aforementioned method. The transmission power of the radio apparatus 30-1 may be calculated from the maximum transmission power of the radio apparatus 30-1 and the number of weights already selected for the radio apparatus 30-1. The transmission power of the radio apparatus 30-2 is also calculated in a way similar to that when the transmission power of the radio apparatus 30-1 is calculated.

After the weight selection unit 2113 selects one of the combinations calculated by the weight calculation unit 2112 by the aforementioned selection method, the weight selection unit 2113 holds the selected combination (the pre-coding and the post-coding).

Next, the pre-coding weight generation unit 211 determines whether or not the total number of weights has reached a predetermined number (Step S104). The pre-coding weight generation unit 211 determines whether the number of combinations of the pre-coding weights and the post-coding weights held in the weight selection unit 2113 has reached the predetermined number. The predetermined number may be M, which is the number of antennas in the radio terminal 40.

When the number of combinations held in the weight selection unit 2113 is equal to or larger than the predetermined number (YES in Step S104), the pre-coding weight generation unit 211 ends the operation of generating the pre-coding weight.

On the other hand, the number of combinations held in the weight selection unit 2113 is smaller than the predetermined number (NO in Step S104), Step S105 is executed.

In Step S105, the channel information matrix orthogonalization unit 2114 projects the channel information matrices of the respective radio apparatuses 30-1 and 30-2 onto the subspace that is orthogonal to the post-coding weight included in the combination selected in Step S103 (Step S105).

The channel information matrix orthogonalization unit 2114 may perform orthogonal transformation on the M×N-dimensional channel matrix. When the M-dimensional post-coding weight vector selected in the weight selection unit 2113 is denoted by g, the M×N-dimensional channel matrix $H_b$ of the radio apparatus 30-$b$ (b is 1 or 2) is orthogonalized by the following Expression (1).

$$H_b = (I_M - gg^H)H_b \qquad (1)$$

Note that $I_M$ denotes the M×M-dimensional unit matrix and $^H$ denotes the Hermitian transpose.

Further, the channel information matrix orthogonalization unit 2114 may perform orthogonal transformation on the correlation matrix of the M×N-dimensional channel matrix. The M×M-dimensional correlation matrix $R_b$, which is the product of the channel matrix $H_b$ and the Hermitian transpose of the channel matrix $H_b$, is orthogonalized by the following Expression (2).

$$R_b = (I_M - gg^H)R_b(I_M - gg^H) \qquad (2)$$

The channel information matrix orthogonalization unit 2114 transmits the channel information matrix that has been subjected to orthogonal transformation by the above Expression (1) or (2) to the weight calculation unit 2112. Then the weight calculation unit 2112 executes Step S102 using the channel information matrix projected and generated by the channel information matrix orthogonalization unit 2114.

When the operation example shown in FIG. 5 is ended, the weight selection unit 2113 transmits the pre-coding weight included in the combinations that are being held to the radio apparatus that corresponds to each pre-coding weight. When the weight selection unit 2113 selects one of the combinations calculated by the weight calculation unit 2112, the weight selection unit 2113 knows which one of the radio apparatuses 30 the selected combination corresponds to. Thus, the weight selection unit 2113 is able to transmit the pre-coding weight that it holds to the radio apparatus that corresponds to each pre-coding weight. Note that the scheduling unit 213 may transmit an instruction regarding to which radio apparatus 30 the pre-coding weight held in the weight selection unit 2113 should be transmitted.

As described above, while there are a method of sending the same data from the radio apparatus 30-1 and the radio apparatus 30-2 and a method of sending different data from the radio apparatus 30-1 and the radio apparatus 30-2 as a data transmission method in the NCJT method, this example embodiment can be applied to both the transmission methods. When the same data is transmitted from the radio apparatus 30-1 and the radio apparatus 30-2, the weight selection unit 2113 may allocate the two pre-coding weights selected for the respective radio apparatuses 30-1 and 30-2 to one transmission data. Further, when different pieces of data are transmitted from the radio apparatus 30-1 and the radio apparatus 30-2, the weight selection unit 2113 may allocate the pre-coding weights selected for the respective radio apparatuses 30-1 and 30-2 to each transmission data.

As described above, the channel information matrix generation unit 2111 generates the channel information matrix between the radio apparatus 30 and the radio terminal 40. The weight calculation unit 2112 calculates the combination of the pre-coding weight and the post-coding weight for each of the radio apparatuses 30-1 and 30-2. The weight selection unit 2113 selects one of the combinations of the pre-coding weights and the post-coding weights.

When the total number of pre-coding weights that have been selected is smaller than the predetermined number, the channel information matrix orthogonalization unit 2114 projects the channel information matrix onto the subspace orthogonal to the post-coding weight selected by the weight selection unit 2113. The weight calculation unit 2112 and the weight selection unit 2113 further select one combination of the pre-coding weight and the post-coding weight using the channel information matrix that has been subjected to orthogonal transformation by the post-coding weight in which the channel information matrix has been selected. The control apparatus 20 repeats the above operations until the number of selected pre-coding weights reaches a predetermined number.

Accordingly, the pre-coding weight generation unit 211 is able to select (generate) a pre-coding weight in such a way that the signals transmitted from the radio apparatuses 30-1 and 30-2 become orthogonal to each other on the side of the radio terminal 40. Thus, with the control apparatus 20 according to the second example embodiment, it is possible to prevent the situation in which signals transmitted from the radio apparatuses 30-1 and 30-2 cancel each other or interfere with each other and the reception quality in the radio terminal 40 is degraded.

Third Example Embodiment

Next, with reference to the drawings, a third example embodiment will be described. The third example embodiment is an example embodiment in that a radio communication system includes a plurality of radio terminals 40 according to the second example embodiment. Further, in the third example embodiment, a control apparatus generates a pre-coding weight for spatially multiplexing signals to be transmitted to the plurality of radio terminals 40.

<Configuration Example of Radio Communication System>

Figure 6:
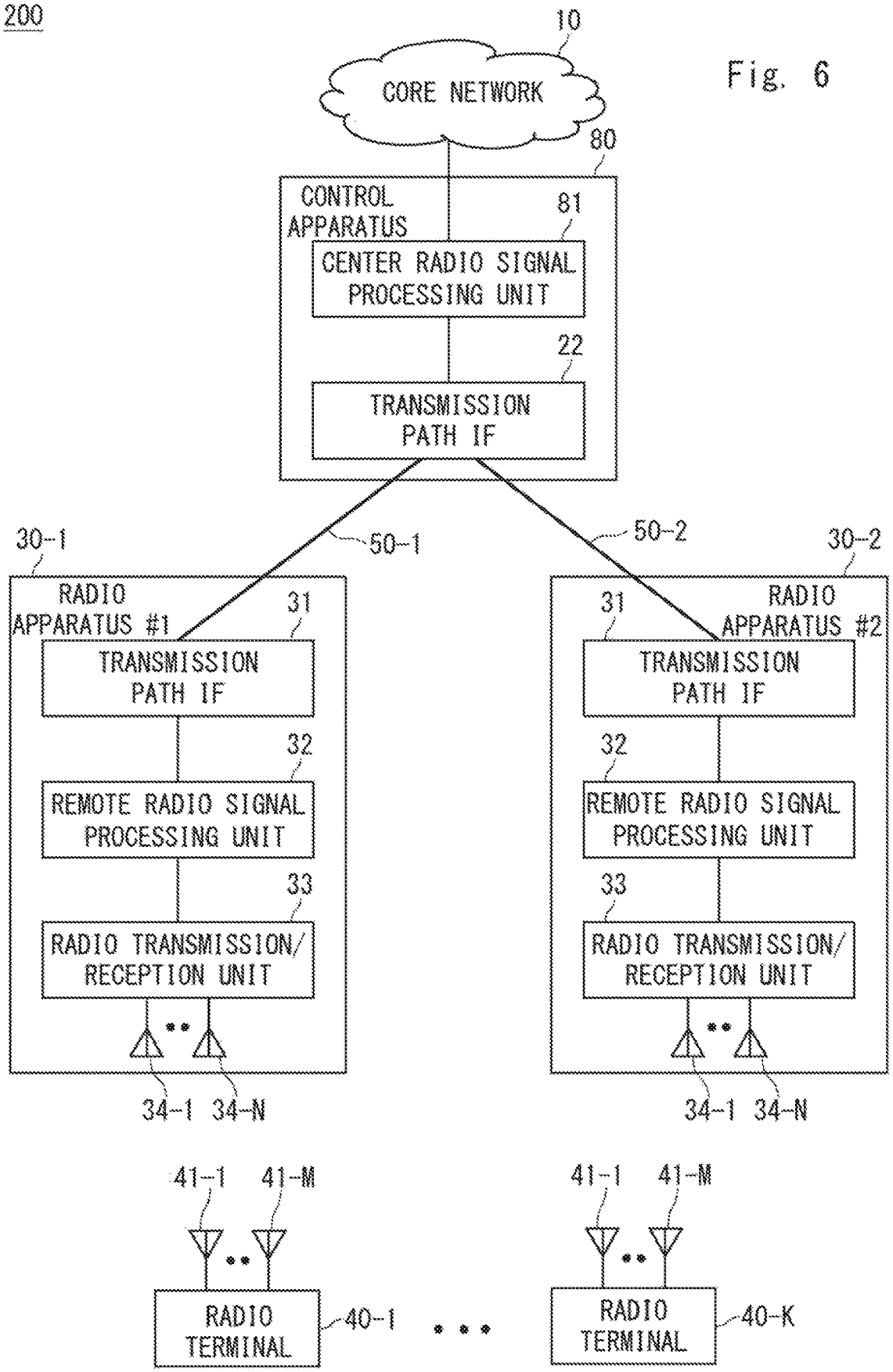
FIG. 6 is a diagram showing a configuration example of a radio communication system according to a third example embodiment.

Referring now to FIG. 6, a radio communication system 200 will be described. FIG. 6 is a diagram showing a configuration example of a radio communication system according to the third example embodiment. As shown in FIG. 6, the radio communication system 200 includes a core network 10, a control apparatus 80, radio apparatuses 30-1 and 30-2, and radio terminals 40-1 to 40-K (K: an integer equal to or larger than two).

The radio communication system 200 is different from the radio communication system 100 according to the second example embodiment in that the radio communication system 200 includes two or more radio terminals 40 and includes the control apparatus 80 in place of the control apparatus 20 provided in the radio communication system 100. Since the configurations of the core network 10 and the radio apparatuses 30-1 and 30-2 are similar to those in the second example embodiment, the descriptions thereof will be omitted. Further, since the configuration of the radio terminals 40-1 to 40-K is similar to that of the radio terminal 40 according to the second example embodiment, the descriptions thereof will be omitted. In the following description, when there is no need to differentiate the radio terminals 40-1 to 40-K, they may be simply referred to as a "radio terminal 40".

<Configuration Example of Control Apparatus>

The control apparatus 80 includes a center radio signal processing unit 81 and a transmission path IF 22. The center radio signal processing unit 81 is provided in place of the center radio signal processing unit 21 according to the second example embodiment. Since the configuration of the transmission path IF 22 is similar to that in the second example embodiment, the descriptions thereof will be omitted.

<Configuration Example of Center Radio Signal Processing Unit>

Figure 7:
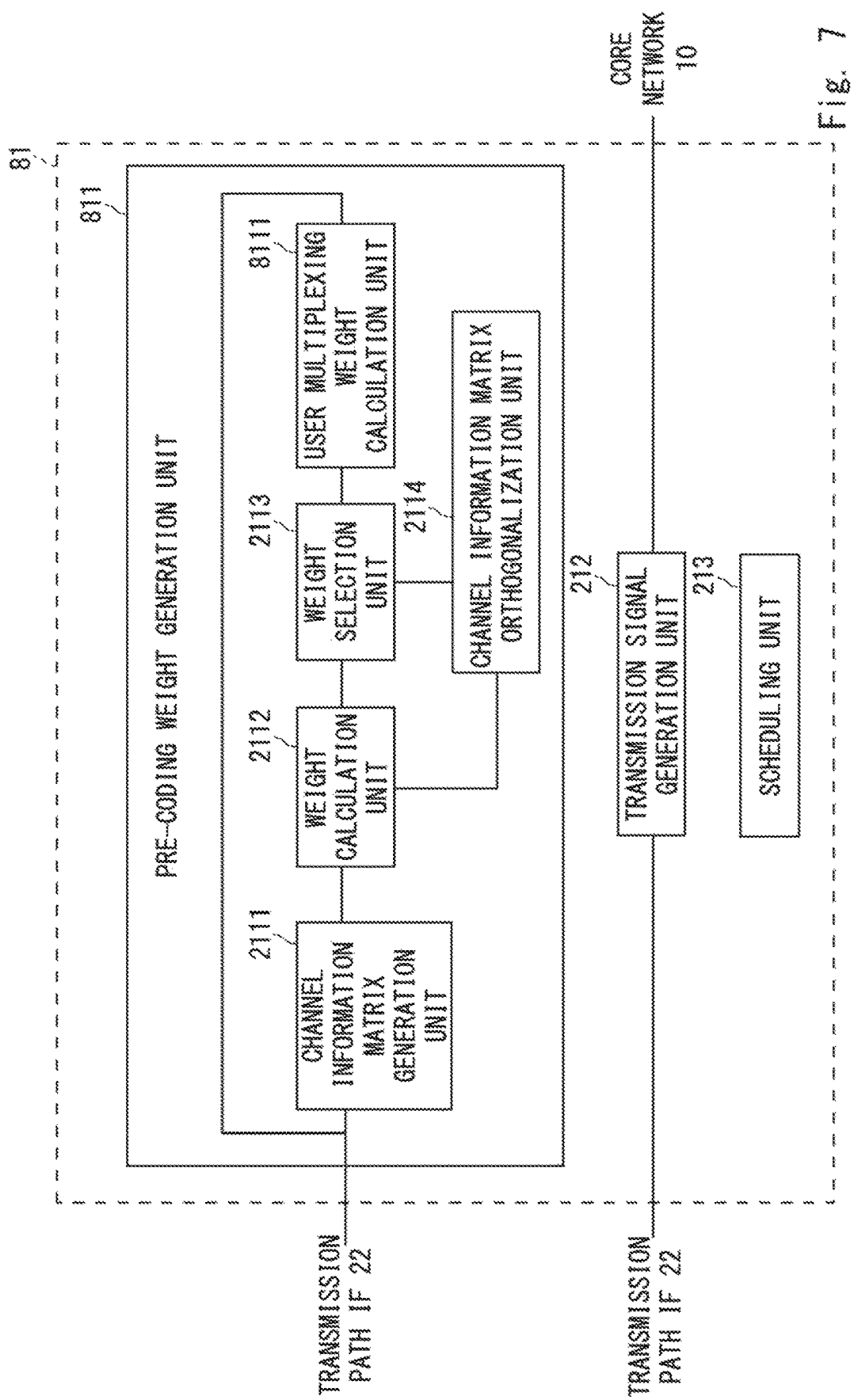
FIG. 7 is a diagram showing a configuration example of a center radio signal processing unit according to the third example embodiment.

Referring next to FIG. 7, a configuration example of the center radio signal processing unit 81 will be described. FIG. 7 is a diagram showing a configuration example of a center radio signal processing unit according to the third example embodiment. The center radio signal processing unit 81 includes a pre-coding weight generation unit 811, a transmission signal generation unit 212, and a scheduling unit 213.

The pre-coding weight generation unit 811 is provided in place of the pre-coding weight generation unit 211 according to the second example embodiment. The pre-coding weight generation unit 811 has a function of generating a pre-coding weight for spatially multiplexing signals to be transmitted to the plurality of radio terminals 40 in addition to the configuration of the pre-coding weight generation unit 211 according to the second example embodiment. The detailed configuration of the pre-coding weight generation unit 811 will be described later.

The configurations of the transmission signal generation unit 212 and the scheduling unit 213 are similar to those of the transmission signal generation unit 212 and the scheduling unit 213 in the second example embodiment. Therefore, descriptions of the transmission signal generation unit 212 and the scheduling unit 213 will be omitted.

<Configuration Example of Pre-Coding Weight Generation Unit>

Next, a configuration example of the pre-coding weight generation unit 811 will be described. As shown in FIG. 7, the pre-coding weight generation unit 811 includes a channel information matrix generation unit 2111, a weight calculation unit 2112, a weight selection unit 2113, a channel information matrix orthogonalization unit 2114, and a user multiplexing weight calculation unit 8111.

The pre-coding weight generation unit 811 is different from the pre-coding weight generation unit 211 according to the second example embodiment in that the pre-coding weight generation unit 811 includes the user multiplexing weight calculation unit 8111. That is, the pre-coding weight generation unit 811 has a configuration in which the user multiplexing weight calculation unit 8111 is added to the pre-coding weight generation unit 211 according to the second example embodiment. Since the configurations of the channel information matrix generation unit 2111, the weight calculation unit 2112, the weight selection unit 2113, and the channel information matrix orthogonalization unit 2114 are basically similar to those in the second example embodiment, the descriptions thereof will be omitted as appropriate.

The channel information matrix generation unit 2111, the weight calculation unit 2112, the weight selection unit 2113, and the channel information matrix orthogonalization unit 2114 are different from those in the second example embodiment in that each of radio terminals 40-1 to 40-K is to be controlled. The channel information matrix generation unit 2111, the weight calculation unit 2112, the weight selection unit 2113, and the channel information matrix orthogonalization unit 2114 execute controls described in the second example embodiment on each of the radio terminals 40-1 to 40-K independently from one another.

The weight selection unit 2113 selects, for each of the radio terminals 40-1 to 40-K, a combination including a predetermined number of pre-coding weights and holds them. The predetermined number may be M, which is the number of antennas in each of the radio terminals 40-1 to 40-K.

The weight selection unit 2113 transmits the pre-coding weight included in the combination held for each of the radio terminals 40-1 to 40-K to the user multiplexing weight calculation unit 8111.

The user multiplexing weight calculation unit 8111 calculates the pre-coding weight for transmitting the signals of the radio terminals 40-1 to 40-K by spatial multiplexing using the pre-coding weight included in the predetermined number of combinations for each of the radio terminals 40-1 to 40-K. Since the pre-coding weights calculated by the user multiplexing weight calculation unit 8111 are pre-coding weights for transmitting the signals of the radio terminals 40-1 to 40-K by spatial multiplexing, they may be referred to as user multiplexing pre-coding weights.

The user multiplexing weight calculation unit 8111 calculates the pre-coding weight for spatial multiplex transmission so as to suppress interference by each of the signals transmitted from the radio apparatuses 30-1 and 30-2 to the radio terminals 40-1 to 40-K with other signals.

The user multiplexing weight calculation unit 8111 transmits the calculated pre-coding weight to the radio apparatus 30 via the transmission path IF 22. The scheduling unit 213 may select a radio terminal for performing spatial multiplex transmission from among the radio terminals 40-1 to 40-K and the user multiplexing weight calculation unit 8111 may calculate the pre-coding weight for spatial multiplex transmission for the selected radio terminal.

<Operation Example of Pre-Coding Weight Generation Unit>

Figure 8:
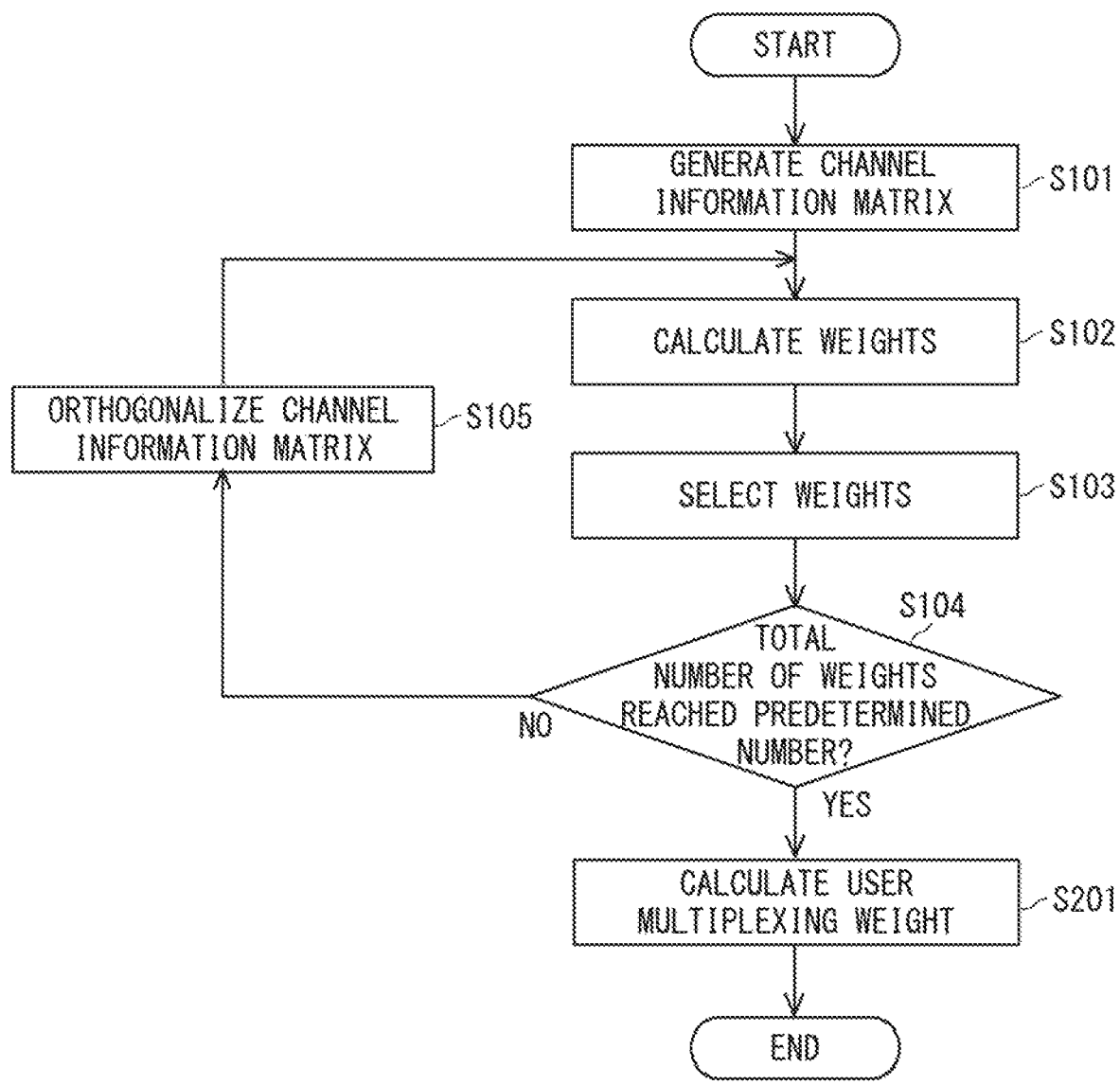
FIG. 8 is a flowchart showing an operation example of a pre-coding weight generation unit according to the third example embodiment.

Referring next to FIG. 8, an operation example of the pre-coding weight generation unit 811 will be described. FIG. 8 is a flowchart showing the operation example of the pre-coding weight generation unit according to the third example embodiment.

The operation example shown in FIG. 8 is different from the operation example shown in FIG. 5 in that Step S201 is further executed when the number of combinations held in the weight selection unit 2113 is equal to or larger than a predetermined number in Step S104.

While the operations in Steps S101-S105 are similar to those in Steps S101-S105 in the second example embodiment, these operations are different from each other in that the operations in Steps S101-S105 are executed for each of the radio terminals 40-1 to 40-K. Since the operations in Steps S101-S105 are similar to those in the second example embodiment, the descriptions thereof will be omitted.

The operations in Steps S101-S105 may be executed on the radio terminals 40-1 to 40-K at the same timing or at different timings. The timing when the channel information is acquired in Step S101 may be different for each of the radio terminals 40-1 to 40-K. Thus, it is sufficient that the operations of Steps S101-S105 be executed for each of the radio terminals 40-1 to 40-K in accordance with the timing when the channel information has been acquired.

In Step S201, the user multiplexing weight calculation unit 8111 calculates the pre-coding weight for transmitting the signals of the radio terminals 40-1 to 40-K by spatial multiplexing (Step S201).

The user multiplexing weight calculation unit 8111 calculates the pre-coding weight for transmitting the signals of the radio terminals 40-1 to 40-K by spatial multiplexing using the pre-coding weight for each of the radio terminals 40-1 to 40-K. When the signals of the radio terminals 40-1 to 40-K are transmitted by spatial multiplexing, signals transmitted to radio terminals different from each other interfere with each other in both of a case in which they are transmitted from one radio apparatus and a case in which they are transmitted from different radio apparatuses. Thus, the user multiplexing weight calculation unit 8111 calculates the pre-coding weight for spatially multiplexing transmission in which the interference by the respective signals transmitted from the radio apparatuses 30-1 and 30-2 to the radio terminals 40-1 to 40-K with other signals is suppressed. In other words, the user multiplexing weight calculation unit 8111 calculates the pre-coding weight for spatially multiplexing transmission in which the respective signals transmitted from the radio apparatuses 30-1 and 30-2 to the radio terminals 40-1 to 40-K do not interfere with each other.

Now, the operation of calculating the pre-coding weight executed in the user multiplexing weight calculation unit 8111 will be described. For the sake of simplification of the description, it is assumed that the radio apparatuses 30-1 and 30-2 each transmit one signal to each of the radio terminals 40-1 to 40-K.

Further, in the following description, the N-dimensional pre-coding weight vector when the signal is transmitted from the radio apparatus 30-$b$ ($b$ is 1 or 2) to the radio terminal 40-$k$ ($k$ is an integer from 1 to K) selected and held by the weight selection unit 2113 is denoted by $f_{b,k}$. Further, the M-dimensional post-coding weight vector that corresponds to the N-dimensional pre-coding weight vector $f_{b,k}$ is denoted by $g_{b,k}$. Further, the M×N-dimensional channel matrix between the radio apparatus 30-$b$ and the radio terminal 40-$k$ is denoted by $H_{k,b}$.

In the following description, an operation of calculating the pre-coding weight performed on the radio apparatus 30-1 will be described as one example. A calculation operation similar to the above operation is applied also to the radio apparatus 30-2.

First, the user multiplexing weight calculation unit 8111 generates the N×K-dimensional matrix $F_{D,1}$ including the N-dimensional pre-coding weight vector of the radio terminals 40-1 to 40-K selected and held by the weight selection unit 2113 as a column vector. At this time, $F_{D,1}$ can be expressed as shown in Expression (3).

$$F_{D,1}=(f_{1,1},f_{1,2},\ldots f_{1,K}) \quad (3)$$

Next, the user multiplexing weight calculation unit 8111 generates the M×K-dimensional matrix $F_{I,1}$ having the channel component that corresponds to the interference to be given to the signal that the radio apparatus 30-2 has transmitted to the radio terminals 40-1 to 40-K as an element. The channel component that corresponds to the interference with the signal that the radio apparatus 30-2 has transmitted to the radio terminal 40-$k$ is generated based on the M×N-dimensional channel matrix $H_{k,1}$ and the M-dimensional post-coding weight vector $g_{2,k}$. The M×N-dimensional channel matrix $H_{k,1}$ is a channel matrix between the radio apparatus 30-1 and the radio terminal 40-$k$. Further, the M-dimensional post-coding weight vector $g_{2,k}$ is a post-coding weight vector that the radio terminal 40-$k$ uses when it receives the signal of the radio apparatus 30-2. That is, the N×K-dimensional matrix $F_{I,1}$ can be expressed as shown in Expression (4).

$$F_{I,1} = \left( \frac{H_{1,1}^H g_{2,1}}{\|H_{1,1}^H g_{2,1}\|} \quad \frac{H_{2,1}^H g_{2,2}}{\|H_{2,1}^H g_{2,2}\|} \quad \cdots \quad \frac{H_{K,1}^H g_{2,K}}{\|H_{K,1}^H g_{2,K}\|} \right) \quad (4)$$

The number of column vectors that compose $F_{I,1}$ may be reduced in accordance with the amount of the interference. That is, when the magnitude of the product of the Hermitian transpose of the channel matrix $H_{k,1}$ and the post-coding weight vector $g_{2,k}$ is smaller than a predetermined value, this column vector may be excluded from $F_{I,1}$. Further, the post-coding weight vector may be derived from the product of the corresponding pre-coding weight and the channel matrix.

Further, the user multiplexing weight calculation unit 8111 generates the M×2K-dimensional matrix $F_1$ using $F_{D,1}$ and $F_{I,1}$ as shown in Expression (5).

$$F_1=(F_{D,1}F_{I,1}) \quad (5)$$

Then, as shown in Expression (6), the user multiplexing weight calculation unit 8111 generates the Zero Forcing (ZF) based M×2K-dimensional weight matrix $W_1$ using the M×2K-dimensional matrix $F_1$ in Expression (5).

$$W_1=F_1(F_1^H F_1)^{-1} \quad (6)$$

Lastly, the user multiplexing weight calculation unit 8111 transmits the respective column vectors in the first to the K-th columns of the N×2K-dimensional weight matrix $W_1$ to the radio apparatus 30-1 as the N-dimensional pre-coding weight vectors for the respective radio terminals 40-1 to 40-K.

While the user multiplexing weight calculation unit 8111 uses the ZF method for the generation of the weight matrices in the aforementioned description, a Minimum Mean Square Error (MMSE) method, a block diagonalization method or the like may instead be used.

As described above, the control apparatus 80 includes a configuration that the control apparatus 20 according to the second example embodiment has. Thus, even when the control apparatus 80 according to the third example embodiment is used, like in the second example embodiment, it is possible to prevent the situation in which the signals transmitted from the radio apparatuses 30-1 and 30-2 cancel each other or interfere with each other and the reception quality is degraded in the radio terminals 40-1 to 40-K.

Further, in the third example embodiment, the user multiplexing weight calculation unit 8111 generates the pre-coding weights for transmitting the signals of the plurality of radio terminals by spatial multiplexing. Thus, the control apparatus 80 is able to suppress interference between the signals of the plurality of radio terminals by including therein the user multiplexing weight calculation unit 8111. Thus, with the control apparatus 80 according to the third example embodiment, it is possible to further improve the reception quality in the radio terminal when the signals of the plurality of radio terminals are transmitted by spatial multiplexing compared to the second example embodiment.

Other Example Embodiments

Figure 9:
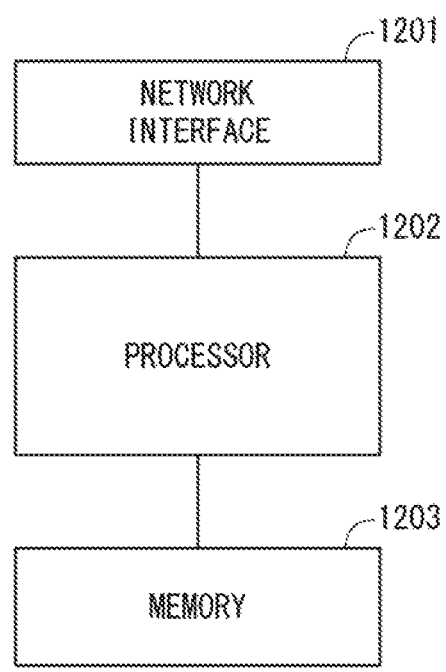
FIG. 9 is a block diagram illustrating a hardware configuration of a computer (information processing apparatus) capable of achieving a control apparatus and the like according to each of the example embodiments of the present disclosure.

The control apparatuses 1, 20, and 80 (hereinafter these apparatuses are referred to as the control apparatus 1 and the like) according to the above example embodiments may include the following hardware configuration. FIG. 9 is a block diagram illustrating a hardware configuration of a computer (information processing apparatus) capable of achieving the control apparatus and the like according to each of the example embodiments of the present disclosure.

With reference to FIG. 9, the control apparatus 1 and the like include a network interface 1201, a processor 1202, and a memory 1203. The network interface 1201 is used to communicate with other communication apparatuses such as the radio apparatuses 30-1 and 30-2 that are included in the radio communication system.

The processor 1202 executes the processing of the control apparatus 1 and the like described with reference to the flowcharts in the aforementioned embodiments by loading a software (computer program) from the memory 1203 and executing the loaded software. The processor 1202 may be, for example, a microprocessor, a Micro Processing Unit (MPU), or a Central Processing Unit (CPU). The processor 1202 may include a plurality of processors.

The memory 1203 is formed of a combination of a volatile memory and a nonvolatile memory. The memory 1203 may include a storage located apart from the processor 1202. In this case, the processor 1202 may access the memory 1203 via an Input/Output (I/O) interface (not shown).

In the example shown in FIG. 9, the memory 1203 is used to store software modules. The processor 1202 is able to achieve the operations of the control apparatus 1 and the like described in the aforementioned embodiments by loading these software modules from the memory 1203 and executing processing in accordance with the instruction by the above software modules.

As described above with reference to FIG. 9, each of the processors that the control apparatus 1 and the like include executes one or a plurality of programs including instructions for causing a computer to execute an algorithm described with reference to the drawings.

The programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media.

Examples of transitory computer readable media include electric signals, optical signals, and electromagnetic waves. Transitory computer readable media can provide the program to a computer via a wired communication line (e.g., electric wires, and optical fibers) or a wireless communication line.

The User Equipment (or "UE", "mobile station", "mobile device" or "wireless device") in the present disclosure is an entity connected to a network via a wireless interface.

It should be noted that the present disclosure is not limited to a dedicated communication device, and can be applied to any device having a communication function as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT (internet of things) devices, IoT devices, and machinery. It will be appreciated that the terms "mobile station" and "mobile device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper projecting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices. It will be appreciated that a UE may support one or more IoT or MTC applications. Some examples of MTC applications are listed in the following table (source: 3GPP TS 22.368 V13.1.0, Annex B, the contents of which are incorporated herein by reference). This list is not exhaustive and is intended to be indicative of some examples of machine type communication applications.

TABLE 1

| Service Area | MTC applications |
| --- | --- |
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |

TABLE 1-continued

| Service Area | MTC applications |
| --- | --- |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote | Sensors |
| Maintenance/Control | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary embodiments described in the present document. Needless to say, these technical ideas and embodiments are not limited to the above-described UE and various modifications can be made thereto.

Note that the present disclosure is not limited to the above-described embodiments and can be modified as appropriate without departing from the spirit and scope of the present disclosure. Further, the present disclosure may be implemented by combining the above-described embodiments with one another.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary Note 1)

A control apparatus comprising:

a first calculation unit configured to calculate, for each of at least one radio terminal, a combination of a pre-coding weight and a post-coding weight for each of a plurality of radio apparatuses connected to the control apparatus using a first channel information matrix based on estimated values of channel responses between each of the plurality of radio apparatuses and each of the at least one radio terminal;

a selection unit configured to select, for each of the at least one radio terminal, one combination from the combinations calculated using the first channel information matrices as a first combination; and an orthogonalization unit configured to generate, for each of the at least one radio terminal, a second channel information matrix for each of the plurality of radio apparatuses by projecting each first channel information matrix onto the subspace orthogonal to the post-coding weight included in the first combination, wherein the first calculation unit calculates, for each of the at least one radio terminal, the combination for each of the plurality of radio apparatuses using the second channel information matrix, and wherein the selection unit selects, for each of the at least one radio terminal, one combination from the combinations calculated using the second channel information matrices as a second combination.

(Supplementary Note 2)

The control apparatus according to Supplementary Note 1, wherein when the first channel information matrix is a channel matrix whose elements are the estimated values of the channel responses, the second channel information matrix is a channel matrix obtained by projecting the channel matrix by the orthogonalization unit, and when the first channel information matrix is a channel matrix obtained by projecting the channel matrix by the orthogonalization unit once or more times, the second channel information matrix is a channel matrix obtained by further projecting the projected channel matrix by the orthogonalization unit.

(Supplementary Note 3)

The control apparatus according to Supplementary Note 2, wherein the first calculation unit calculates the combination by a singular value decomposition of each of the first channel information matrix and the second channel information matrix.

(Supplementary Note 4)

The control apparatus according to Supplementary Note 1, wherein when the first channel information matrix is a correlation matrix of a channel matrix whose elements are the estimated values of the channel responses, the second channel information matrix is a correlation matrix obtained by projecting the correlation matrix by the orthogonalization unit, and when the first channel information matrix is a correlation matrix obtained by projecting the correlation matrix once or more times by the orthogonalization unit, the second channel information matrix is a correlation matrix obtained by further projecting this projected correlation matrix by the orthogonalization unit.

(Supplementary Note 5)

The control apparatus according to Supplementary Note 4, wherein the first calculation unit calculates the combination using an eigenvalue decomposition of each of the first channel information matrix and the second channel information matrix and a channel matrix that corresponds to each of the first channel information matrix and the second channel information matrix.

(Supplementary Note 6)

The control apparatus according to Supplementary Note 5, wherein the first calculation unit calculates a post-coding weight by an eigenvalue decomposition of each of the first channel information matrix and the second channel information matrix and calculates a pre-coding weight that forms the combination with the post-coding weight using the post-coding weight and a channel matrix that corresponds to each of the first channel information matrix and the second channel information matrix.

(Supplementary Note 7)

The control apparatus according to any one of Supplementary Notes 1 to 6, wherein the selection unit selects the combination that maximizes a channel gain from the combinations calculated by the first calculation unit.

(Supplementary Note 8)

The control apparatus according to any one of Supplementary Notes 1 to 6, wherein the selection unit selects the combination that maximizes a received power from the combinations calculated by the first calculation unit.

(Supplementary Note 9)

The control apparatus according to any one of Supplementary Notes 1 to 8, wherein the selection unit selects, for each of the at least one radio terminal, a predetermined number of the combinations, and the control apparatus further comprises a second calculation unit configured to calculate user multiplexing pre-coding weights for performing spatial multiplexing transmission on the at least one radio terminal using the pre-coding weights included in the predetermined number of the combinations.

(Supplementary Note 10)

The control apparatus according to Supplementary Note 9, wherein the second calculation unit calculates the user multiplexing pre-coding weights that suppress the interference of each signal transmitted from the plurality of radio apparatuses to the at least one radio terminal on the other signals transmitted from the plurality of radio apparatuses to the at least one radio terminal.

(Supplementary Note 11)

A radio communication method executed by a control apparatus, the method comprising:

calculating, for each of at least one radio terminal, a combination of a pre-coding weight and a post-coding weight for each of a plurality of radio apparatuses connected to the control apparatus using a first channel information matrix based on estimated values of channel responses between each of the plurality of radio apparatuses and each of the at least one radio terminal;

selecting, for each of the at least one radio terminal, one combination from the combinations calculated using the first channel information matrices as a first combination;

generating, for each of the at least one radio terminal, a second channel information matrix for each of the plurality of radio apparatuses by projecting each first channel information matrix onto the subspace orthogonal to the post-coding weight included in the first combination;

calculating, for each of the at least one radio terminal, the combination for each of the plurality of radio apparatuses using the second channel information matrix; and selecting, for each of the at least one radio terminal, one combination from the combinations calculated using the second channel information matrix as a second combination.

(Supplementary Note 12)

A radio communication program for causing a control apparatus to execute the following processing of:

calculating, for each of at least one radio terminal, a combination of a pre-coding weight and a post-coding weight for each of a plurality of radio apparatuses connected to the control apparatus using a first channel information matrix based on estimated values of channel responses between each of the plurality of radio apparatuses and each of the at least one radio terminal;

selecting, for each of the at least one radio terminal, one combination from the combinations calculated using the first channel information matrices as a first combination;

generating, for each of the at least one radio terminal, a second channel information matrix for each of the plurality of radio apparatuses by projecting each first channel information matrix onto the subspace orthogonal to the post-coding weight included in the first combination;

calculating, for each of the at least one radio terminal, the combination for each of the plurality of radio apparatuses using the second channel information matrix; and selecting, for each of the at least one radio terminal, one combination from the combinations calculated using the second channel information matrix as a second combination.

(Supplementary Note 13)

A radio communication system comprising a control apparatus, a plurality of radio apparatuses connected to the control apparatus, and at least one radio terminal that performs radio communication with the plurality of radio apparatuses, wherein the control apparatus comprises:

a first calculation unit configured to calculate, for each of at least one radio terminal, combinations of pre-coding weights and post-coding weights for each of a plurality of radio apparatuses using a first channel information matrix based on an estimation value of a channel response between each of the plurality of radio apparatuses and each of the at least one radio terminal;

a selection unit configured to select, for each of the at least one radio terminal, one of the combinations calculated using the first channel information matrix as a first combination;

an orthogonalization unit configured to generate, for each of the at least one radio terminal, a second channel information matrix obtained by projecting the first channel information matrix into a space orthogonal to a post-coding weight included in the first combination;

the first calculation unit calculates, for each of the at least one radio terminal, the combination for each of the plurality of radio apparatuses using the second channel information matrix; and the selection unit selects, for each of the at least one radio terminal, one of the combinations calculated using the second channel information matrix as a second combination.

According to the present disclosure, it is possible to provide a control apparatus, a radio communication method, and a radio communication program capable of preventing the reception quality in the radio terminal from being degraded.

What is claimed is:

1. A control apparatus comprising:
at least one memory storing instructions; and
at least one processor configured to execute the instructions to:
calculate, for each of at least one radio terminal, a combination of a pre-coding weight and a post-coding weight for each of a plurality of radio apparatuses connected to the control apparatus using a first channel information matrix based on estimated values of channel responses between each of the plurality of radio apparatuses and each of the at least one radio terminal;

select, for each of the at least one radio terminal, one
combination from the combinations calculated using
the first channel information matrices as a first combination;
generate, for each of the at least one radio terminal, a
second channel information matrix for each of the
plurality of radio apparatuses by projecting each first
channel information matrix onto the subspace orthogonal to the post-coding weight included in the first
combination;
calculate, for each of the at least one radio terminal, the
combination for each of the plurality of radio apparatuses using the second channel information matrix; and
select, for each of the at least one radio terminal, one
combination from the combinations calculated using
the second channel information matrices as a second
combination.

2. The control apparatus according to claim 1, wherein
when the first channel information matrix is a channel
matrix whose elements are the estimated values of the
channel responses, the second channel information
matrix is a channel matrix obtained by projecting the
channel matrix using the post-coding weight included
in the first combination, and
when the first channel information matrix is a channel
matrix obtained by projecting the channel matrix once
or more times, the second channel information matrix
is a channel matrix obtained by further projecting the
projected channel matrix using the post-coding weight
included in the first combination.

3. The control apparatus according to claim 2,
wherein the at least one processor is further configured to
execute the instructions to calculate the combination by
a singular value decomposition of each of the first
channel information matrix and the second channel
information matrix.

4. The control apparatus according to claim 1, wherein
when the first channel information matrix is a correlation
matrix of a channel matrix whose elements are the
estimated values of the channel responses, the second
channel information matrix is a correlation matrix
obtained by projecting the correlation matrix using the
post-coding weight included in the first combination,
and
when the first channel information matrix is a correlation
matrix obtained by projecting the correlation matrix
once or more times, the second channel information
matrix is a correlation matrix obtained by further
projecting the projected correlation matrix using the
post-coding weight included in the first combination.

5. The control apparatus according to claim 4, wherein the
at least one processor is further configured to execute the
instructions to calculate the combination using an eigenvalue decomposition of each of the first channel information
matrix and the second channel information matrix and a
channel matrix that corresponds to each of the first channel
information matrix and the second channel information
matrix.

6. The control apparatus according to claim 5, wherein the
at least one processor is further configured to execute the
instructions to calculate a post-coding weight by an eigenvalue decomposition of each of the first channel information
matrix and the second channel information matrix, and
calculate a pre-coding weight that forms the combination
with the post-coding weight using the post-coding weight
and a channel matrix that corresponds to each of the first
channel information matrix and the second channel information matrix.

7. The control apparatus according to claim 1, wherein the
at least one processor is further configured to execute the
instructions to select the combination that maximizes a
channel gain from the combinations.

8. The control apparatus according to claim 1, wherein the
at least one processor is further configured to execute the
instructions to select the combination that maximizes a
received power from the combinations.

9. The control apparatus according to claim 1,
wherein the at least one processor is further configured to
execute the instructions to:
select, for each of the at least one radio terminal, a
predetermined number of the combinations, and
calculate user multiplexing pre-coding weights for performing spatial multiplexing transmission on the at
least one radio terminal using the pre-coding weights
included in the predetermined number of the combinations.

10. The control apparatus according to claim 9, wherein
the at least one processor is further configured to execute the
instructions to calculate the user multiplexing pre-coding
weights that suppress the interference of each signal transmitted from the plurality of radio apparatuses to the at least
one radio terminal on the other signals transmitted from the
plurality of radio apparatuses to the at least one radio
terminal.

11. A method executed by a control apparatus, the method
comprising:
calculating, for each of at least one radio terminal, a
combination of a pre-coding weight and a post-coding
weight for each of a plurality of radio apparatuses
connected to the control apparatus using a first channel
information matrix based on estimated values of channel responses between each of the plurality of radio
apparatuses and each of the at least one radio terminal;
selecting, for each of the at least one radio terminal, one
combination from the combinations calculated using
the first channel information matrices as a first combination;
generating, for each of the at least one radio terminal, a
second channel information matrix for each of the
plurality of radio apparatuses by projecting each first
channel information matrix onto the subspace orthogonal to the post-coding weight included in the first
combination;
calculating, for each of the at least one radio terminal, the
combination for each of the plurality of radio apparatuses using the second channel information matrix; and
selecting, for each of the at least one radio terminal, one
combination from the combinations calculated using
the second channel information matrices as a second
combination.

12. A non-transitory computer readable medium storing a
radio communication program for causing a control apparatus to execute the following processing of:
calculating, for each of at least one radio terminal, a
combination of a pre-coding weight and a post-coding
weight for each of a plurality of radio apparatuses
connected to the control apparatus using a first channel
information matrix based on estimated values of channel responses between each of the plurality of radio
apparatuses and each of the at least one radio terminal;

selecting, for each of the at least one radio terminal, one combination from the combinations calculated using the first channel information matrices as a first combination;

generating, for each of the at least one radio terminal, a second channel information matrix for each of the plurality of radio apparatuses by projecting each first channel information matrix onto the subspace orthogonal to the post-coding weight included in the first combination;

calculating, for each of the at least one radio terminal, the combination for each of the plurality of radio apparatuses using the second channel information matrix; and selecting, for each of the at least one radio terminal, one combination from the combinations calculated using the second channel information matrix as a second combination.

* * * * *